United States Patent [19]
Ball et al.

[11] 4,068,332
[45] Jan. 17, 1978

[54] BED LOCKING INSERT PLATES

[75] Inventors: Kirby L. Ball; Glenn S. Nance; Roy J. Turner, all of Thomasville, N.C.

[73] Assignee: Armstrong Cork Company, Lancaster, Pa.

[21] Appl. No.: 741,778

[22] Filed: Nov. 15, 1976

[51] Int. Cl.² .............................................. A47C 19/00
[52] U.S. Cl. ...................................... 5/296; 403/187; 403/230
[58] Field of Search ................... 5/295, 296, 294, 297; 403/187, 230, 263

[56] References Cited
U.S. PATENT DOCUMENTS

| 2,627,616 | 2/1953 | Lasting | 5/296 |
| 3,154,797 | 11/1964 | Lovette | 5/296 X |
| 3,226,736 | 1/1966 | Krieger | 5/296 |

FOREIGN PATENT DOCUMENTS

| 570,616 | 2/1933 | Germany | 5/296 |

*Primary Examiner*—Andrew V. Kundrat

[57] ABSTRACT

A connecting device is provided for fastening together two elements. Bed post insertion plates are mounted to a bed post for the purpose of supporting bed rails. The bed rails contain hook structures which mount on spaced pins in the bed post insertion plates. The structure interlocks bed rails with a bed post.

1 Claim, 6 Drawing Figures

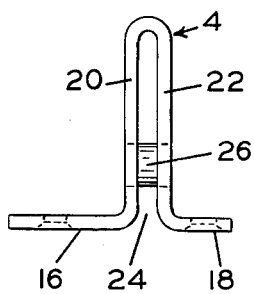
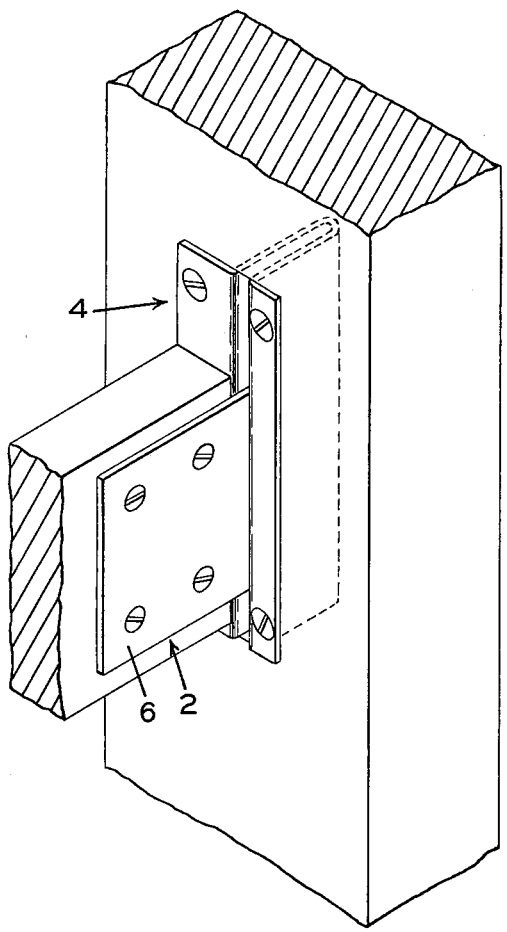
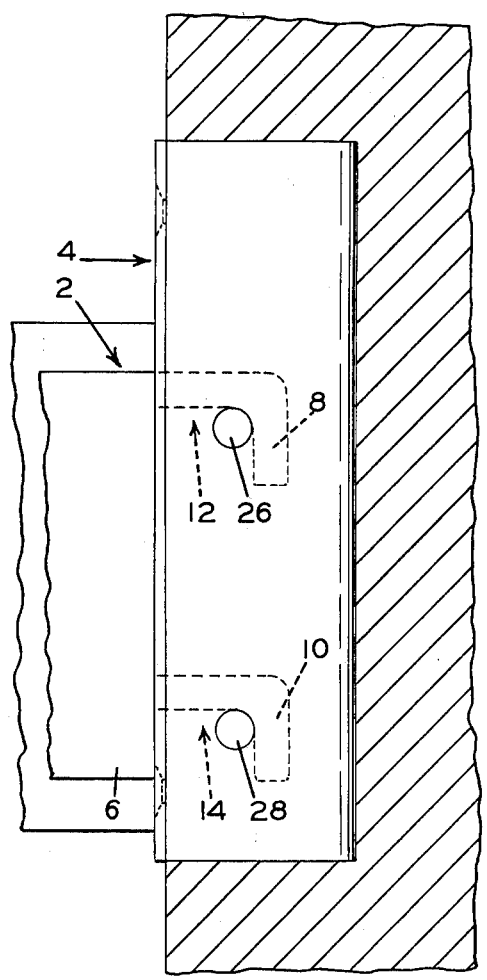

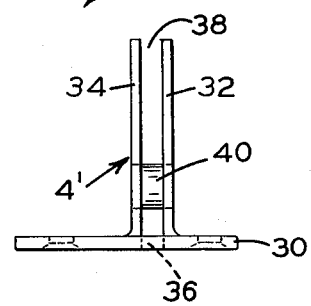
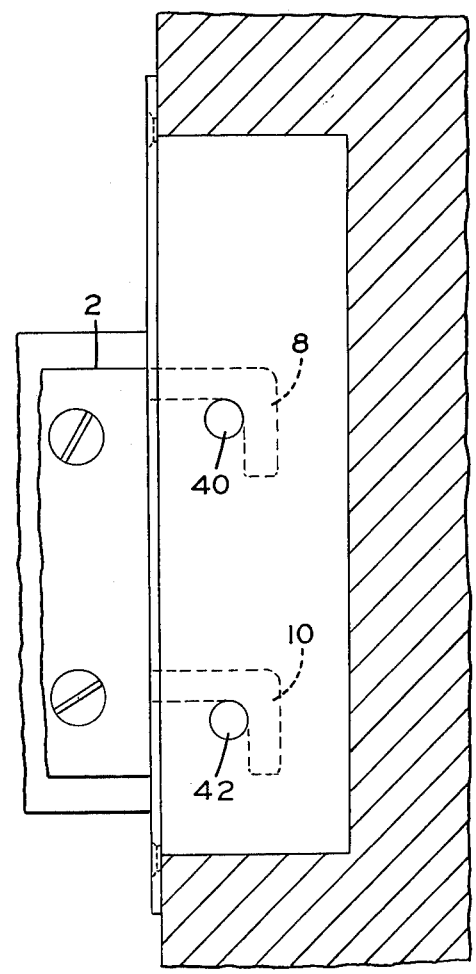
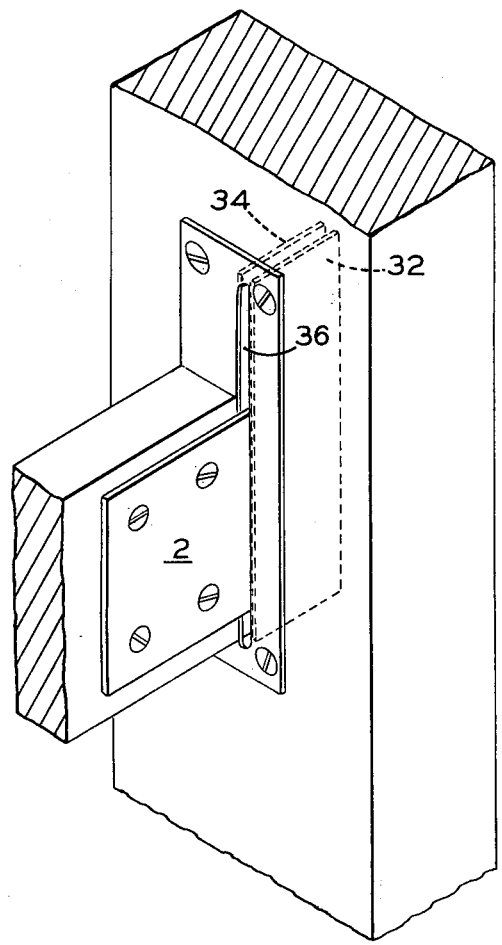

BED LOCKING INSERT PLATES

BACKGROUND OF THE INVENTION

1. Field of the Invention

The invention is directed to a connecting device and, more particularly, to a connecting structure for furniture.

2. Description of the Prior Art

U.S. Pat. No. 2,656,550 shows a typical connecting device for fastening together parts of a bed. One plate with apertures and hooks engages a second plate with apertures and hooks. Austrian Pat. No. 19,371 is another example of a connecting device for a bed wherein one member contains hook elements which engage an apertured plate on a headboard. Finally, Austrian Pat. No. 96,132 is a third showing of a connecting device for a bed wherein hook elements engage pin-like elements to fasten together a bed structure.

The invention herein is directed to a very specific connecting device for beds which device is particularly useful in beds made of low-strength wood such as white pine.

SUMMARY OF THE INVENTION

The invention is directed to a connecting device which consists of two interconnecting members. The first interconnecting member is a plate having two L-shaped hooks which are spaced one above the other in the same plane. The second interconnecting member is two parallel plates which are spaced apart a distance slightly greater than the thickness of the hooks. Pin means span the space between the parallel plates and function as engagement points for the hooks of the first interconnecting member. The second interconnecting member is mounted within the structure on which it is mounted. Consequently, the second interconnecting member will be firmly mounted to a low-strength wood product.

The second interconnecting member can be made from a single plate, bent and shaped to the desired form, or it can be made from plural plates which are fastened together to give one the desired shape for the interconnecting member.

BRIEF DESCRIPTION OF THE DRAWING

FIG. 1 is a top view of a portion of the interconnecting device of the invention herein, FIG. 2 is a side view of the device of FIG. 1, FIG. 3 is a perspective view of the device of FIG. 1 in use, FIG. 4 is a top view of another embodiment of the device of FIG. 1, FIG. 5 is a side view of the device of FIG. 4, and FIG. 6 is a perspective view of the device of FIG. 5 in use.

DESCRIPTION OF THE PREFERRED EMBODIMENTS

FIGS. 1-3 show one embodiment of the invention. The connecting device is composed of two components 2 and 4. Component 2, the first interconnecting member, is a flat plate 6 which has extending from one side thereof hook members 8 and 10. Both hooks are in the same plane as the plate 6 and both hooks have their openings 12 and 14 facing in the same direction.

The second interconnecting member 4 is formed from one piece of 3/32 inch thick sheet metal. As best shown in FIG. 1, it is formed with two flanges 16 and 18 and a body portion which is generally U-shaped forming two parallel plates 20 and 22. A spacing 24 between the two parallel plates 20 and 22 is sufficiently large to receive the hooks 8 and 10. That is, the spacing is slightly larger than the thickness of the plate 6. Pins 26 and 28 span the spacing 24 between the two plates 20 and 22. The pins are the elements over which the hooks 8 and 10 pass to provide the positive engagement of the hooks 8 and 10 with the member 4.

The connecting device of FIGS. 1-3 is particularly useful with a bed structure. Plate 2 would be fastened to the bed rails and member 4 would be mounted within the headboard post. A cut-out is provided in the headboard post to receive the parallel plates 20 and 22 and the flanges 16 and 18 are on the surface of the bed post, and appropriate screws passing through these flanges fasten member 4 to the headboard post.

FIGS. 4-6 show a modification of the structure of FIGS. 1-3. Member 2 is the same in both embodiments. The modification is primarily in member 4. Member 4 is made from three plates 30, 32 and 34. Plates 32 and 34 are parallel plates and they are welded or affixed to plate 30. The plates are made from 3/32 inch thick steel sheeting. An opening 36 is provided in plate 30 and it communicates with the spacing 38 between plates 32 and 34. Pins 40 and 42 span the spacing 38 and provide engagement points for the hooks 8 and 10. The headboard post is provided with a cut-out which receives the plates 32 and 34. The plate 30 is positioned on the surface of the headboard post and appropriate fastening means fasten the assembly 4' to the headboard post. The spacing between the plates 32 and 34 is sufficient to receive the hooks 8 and 10, and the opening 36 is sufficiently long to permit the hooks to be inserted over the pins 40 and 42 and then drop down into engagement with the pins 40 and 42.

What is claimed is

1. A connecting device consisting of two interconnecting members, the first interconnecting member being a plate having on its one edge two L-shaped hooks spaced one above the other in the same plane with both hooks having their openings facing in the same direction, the second interconnecting member being two parallel plates spaced apart a distance slightly greater than the thickness of the plane of the first-mentioned plate having the L-shaped hooks, pin means spanning the space between said parallel plates and flush with the exterior surface of each plate to provide engagement points for the L-shaped hooks, said L-shaped hooks engaging said pin means and said pin means passing through the openings of the L-shaped hooks and providing a resting point for said hooks, said parallel plates having right angle flanges formed with mounting means for mounting said parallel plates in position, said parallel plates are separate plates fixed at one end to the flanges which are formed from a single plate with an elongated slot therein having closed ends to permit said L-shaped hooks to pass therethrough to engage said pin means, and said parallel plates having opposite free ends, and with said fixed ends secured contiguous with the respective edges of said elongated slot along the length thereof and terminating at the ends of said elongated slot so as to be overlapped by the ends of said single plate with the ends of said single plate extending beyond the ends of said parallel plates said plate with the L-shaped hooks being fastened to the side rails of a bed, and said parallel plates are embedded in the post of the headboard of the bed.

* * * * *